(12) United States Patent
Hallbäck et al.

(10) Patent No.: US 8,109,093 B2
(45) Date of Patent: Feb. 7, 2012

(54) METHOD AND AN ARRANGEMENT IN CONNECTION WITH A TURBOCHARGED PISTON ENGINE

(75) Inventors: Björn Hallbäck, Jungsund (FI); Piia Takala, Lapua (FI)

(73) Assignee: Wärtsilä Finland Oy, Vaasa (FI)

( * ) Notice: Subject to any disclaimer, the term of this patent is extended or adjusted under 35 U.S.C. 154(b) by 470 days.

(21) Appl. No.: 11/916,336

(22) PCT Filed: May 11, 2006

(86) PCT No.: PCT/FI2006/050188
§ 371 (c)(1),
(2), (4) Date: Jan. 8, 2008

(87) PCT Pub. No.: WO2006/128961
PCT Pub. Date: Dec. 7, 2006

(65) Prior Publication Data
US 2008/0196407 A1    Aug. 21, 2008

(30) Foreign Application Priority Data
Jun. 2, 2005    (FI) .................................. 20055275

(51) Int. Cl.
*F02B 33/44*    (2006.01)
*F02B 47/02*    (2006.01)
*F02M 25/00*    (2006.01)

(52) U.S. Cl. .......... 60/611; 60/606; 123/25 J; 123/25 R; 123/25 L; 123/25 N

(58) Field of Classification Search .................... 60/599, 60/606, 614, 615, 619, 611; 123/25, 25 J, 123/25 R, 25 L, 25 N
See application file for complete search history.

(56) References Cited

U.S. PATENT DOCUMENTS

| | | | | |
|---|---|---|---|---|
| 2,633,698 | A * | 4/1953 | Nettel | 60/606 |
| 2,968,698 | A * | 1/1961 | Brightman et al. | 370/386 |
| 4,077,219 | A  | 3/1978 | Melchior et al. | |
| 4,125,999 | A * | 11/1978 | Melchior | 60/606 |
| 4,233,815 | A * | 11/1980 | Melchior | 60/606 |
| 4,411,224 | A * | 10/1983 | Goodman | 123/25 A |
| 4,558,665 | A * | 12/1985 | Sandberg et al. | 123/25 C |

(Continued)

FOREIGN PATENT DOCUMENTS

CN    1573045 A    2/2005

(Continued)

OTHER PUBLICATIONS

Osamu Shimakura, JP Search Report for JP 2008-514133, Nov. 19, 2010.

*Primary Examiner* — Thai Ba Trieu
(74) *Attorney, Agent, or Firm* — Chernoff, Vilhauer, McClung & Stenzel

(57) ABSTRACT

The invention relates to a method and an arrangement in connection with a piston engine provided with a turbocompressor. In the method, combustion air from the engine is pressurized by the compressor of the turbocompressor, pressurized combustion air is humidified, fuel is combusted in the cylinder of the engine by means of combustion air and the exhaust gases generated during the combustion are conveyed by means of combustion air to the turbine of the turbocompressor. A partial flow is separated from the pressurized combustion air flow, conveyed past the engine and combined with the exhaust gas flow going to the turbine.

3 Claims, 1 Drawing Sheet

U.S. PATENT DOCUMENTS

| | | | |
|---|---|---|---|
| 4,559,784 A * | 12/1985 | Jenny et al. | 60/606 |
| 4,785,635 A * | 11/1988 | Melchior et al. | 60/606 |
| 4,833,886 A * | 5/1989 | Meier | 60/602 |
| 4,960,080 A * | 10/1990 | O'Neill et al. | 123/25 A |
| 5,657,630 A | 8/1997 | Kjemtrup et al. | |
| 5,724,813 A * | 3/1998 | Fenelon et al. | 60/606 |
| 6,003,500 A * | 12/1999 | Packard et al. | 123/563 |
| 6,035,834 A * | 3/2000 | Packard et al. | 123/563 |
| 6,082,311 A * | 7/2000 | Collin | 123/25 R |
| 6,138,647 A * | 10/2000 | Packard et al. | 123/563 |
| 6,145,498 A * | 11/2000 | Packard et al. | 123/563 |
| 6,276,139 B1 * | 8/2001 | Moraal et al. | 60/605.2 |
| 6,289,853 B1 * | 9/2001 | Walczak et al. | 123/25 R |
| 6,334,436 B1 | 1/2002 | Paffrath et al. | |
| 6,347,605 B1 * | 2/2002 | Wettergard | 123/25 B |
| 6,381,961 B1 | 5/2002 | Bischoff | |
| 6,405,686 B1 * | 6/2002 | Wettergard | 123/25 A |
| 6,470,864 B2 * | 10/2002 | Kim et al. | 123/568.12 |
| 6,845,738 B2 * | 1/2005 | Frutschi | 123/25 C |
| 7,032,382 B2 * | 4/2006 | Onodera et al. | 60/606 |
| 7,047,742 B2 | 5/2006 | Kono et al. | |
| 7,225,762 B2 * | 6/2007 | Mahlanen | 123/25 B |
| 7,610,757 B2 * | 11/2009 | Onodera | 60/605.2 |
| 2001/0035171 A1 | 11/2001 | Kim et al. | |
| 2004/0250541 A1 | 12/2004 | Gottemoller et al. | |

FOREIGN PATENT DOCUMENTS

| | | |
|---|---|---|
| DE | 3225867 | 12/1984 |
| DE | 102004024861 | 12/2004 |
| EP | 1205659 | 5/2002 |
| EP | 1205659 A2 | 5/2002 |
| FI | 114236 | 11/1995 |
| JP | 57135216 A * | 8/1982 |
| JP | 07217439 | 8/1995 |
| JP | 2004019589 A | 1/2004 |
| JP | 03037328 | 12/2007 |
| RU | 2082889 C1 * | 6/1997 |
| WO | 0242730 | 5/2002 |
| WO | 03078819 A1 | 9/2003 |
| WO | 03089777 A | 10/2003 |
| WO | 2004104390 | 12/2004 |
| WO | 2004104390 A1 | 12/2004 |

\* cited by examiner

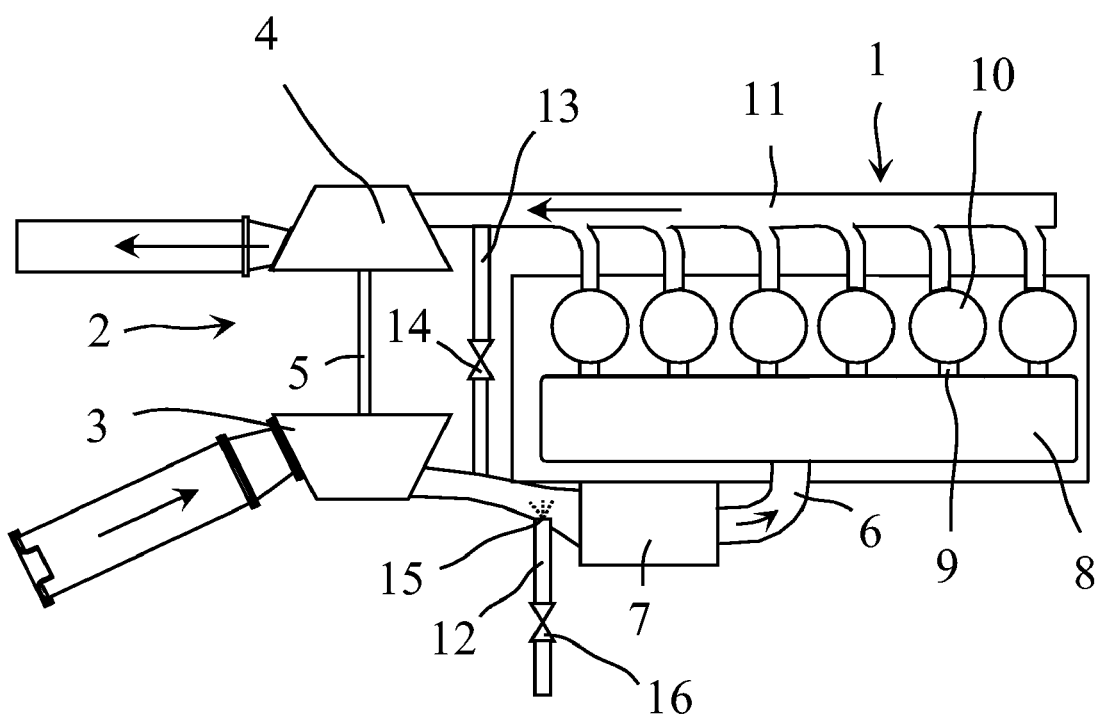

ME THOD AND AN ARRANGEMENT IN CONNECTION WITH A TURBOCHARGED PISTON ENGINE

CROSS-REFERENCE TO RELATED APPLICATION

This is a national stage application filed under 35 USC 371 based on International Application No. PCT/FI2006/050188 filed May 11, 2006, and claims priority under 35 USC 119 of Finnish Patent Application No. 20055275 filed Jun. 2, 2005.

BACKGROUND OF THE INVENTION

The invention relates to a method in connection with a piston engine provided with a turbocompressor.

The invention also relates to an arrangement in connection with a piston engine provided with a turbocompressor.

At high combustion temperatures nitrogen oxides (NOx) are generated in the cylinder of a piston engine and entrained by exhaust gases to the air. Due to the detrimental environmental impacts of nitrogen oxide emissions, efforts are undertaken to prevent the generation of nitrogen oxides (primary methods), or produced nitrogen oxides are removed from the exhaust gases (secondary methods).

Adding water to the combustion process together with combustion air reduces the generation of nitrogen oxide emissions. Water lowers the combustion temperature in the cylinder, whereby less nitrogen oxides are produced. In practise, there are two alternative ways to add water to the combustion process of the piston engine. Water can be supplied either directly to the combustion chamber of the cylinder of the engine or mixed with the combustion air before it enters the cylinder.

To increase engine power, piston engines are often provided with a turbocompressor comprising a compressor, by which pressurised combustion air is supplied to the engine. Further, the turbocompressor comprises a turbine, which drives the compressor. The exhaust gases from the engine are led to the turbine, which converts the energy in the exhaust gases into driving power of the compressor.

The operation of the compressor part of the turbocompressor is restricted on one hand by the limit that corresponds to maximum capacity of the compressor and on the other hand by the so-called surge limit. Surging of the compressor is detrimental to the operation of the engine, since the pressure and flow of the combustion air supplied to the engine will decrease as soon as the compressor surges. For this reason, in order to ensure optimum operation of the compressor and the engine in changing conditions, there should be a specific safety margin between the operating point of the compressor and the surge limit. Also the operating efficiency of the compressor is at its highest, when the operating point is at a certain distance from the surge limit. Therefore, the compressor for each specific application is selected so as to operate at a required distance from the surge limit in normal operating conditions.

If a turbocharged piston engine is provided with such a system for the reduction of nitrogen oxides that water is mixed with combustion air at a point after the compressor, the water supply increases the mass flow rate of the exhaust gas passing through the turbine. Consequently, the rotational speed of the turbine is also increased, whereby the pressure of the suction air will rise after the compressor, if the engine operates at constant load. The flow of the combustion air passing through the compressor will, however, remain constant, whereby the safety margin between the operating point of the compressor and the surge limit will diminish or disappear.

As it should be possible to run the engine also in situations, where the humidification of combustion air is not in use, the compressor needs to be able to operate under two different operating conditions:

1. when the humidification of combustion air is in use, whereby the temperature of the combustion air is 70-75° C. and the mass flow rate passing through the turbine has increased to the same extent as water has been supplied, 2. when the humidification of combustion air is not in use, whereby the temperature of the combustion air is 50-55° C. and there is no extra mass flow passing through the turbine.

By using a compressor dimensioned for a lower flow rate, it should be possible to ensure a sufficient safety margin against surging, but on the other hand this involves the risk of the turbocompressor rotating at overspeed, when the system for humidification of combustion air is in operation. If the humidification system for combustion air is out of operation, the operating point of the compressor moves strongly towards the limiting value corresponding to the maximum capacity, whereby the operating efficiency of the compressor will decrease. Also, the rotational speed of the turbocompressor is in that case substantially higher compared to a situation, where a compressor according to a standard specification is used.

It is an object of the present invention is to provide a technical solution, by which the operation of the turbocompressor of a piston engine provided with humidification of combustion air can be optimised.

SUMMARY OF THE INVENTION

The method according to the invention is based on the idea that a partial flow is separated from the combustion air flow from the compressor to the engine, conveyed past the engine and combined with the exhaust gas flow going to the turbine.

The arrangement according to the invention comprises a by-pass channel, through which a part of the combustion air flow to be conveyed to the engine can be diverted past the engine and combined with the exhaust gas flow going to the turbine.

The arrangement according to the invention it is characterised by what is stated in the characterising part of claim 6.

The invention offers significant benefits.

By means of the invention it is possible to prevent the surging of a compressor, which is optimised for normal combustion air and exhaust gas flows, when the humidification of combustion air is in use. By diverting a part of the combustion air past the cylinders of the engine and combining the partial flow with the exhaust gas flow going to the turbine, the operating point of the compressor moves farther away from the surge limit, when the humidification of combustion air is in operation. Moreover, the operating point of the compressor may be maintained at optimum level in terms of operating efficiency and rotational speed. If the humidification of combustion air is out of use, the by-pass channel is closed, whereby the entire combustion air flow is conveyed in a normal way from the compressor to the engine.

The energy losses caused by the invention are minor. According to performed tests, the fuel consumption of a turbocharged piston engine, which was provided with humidification of combustion air, increased by about 0.3% at the engine load level of 85%, when the arrangement according to the invention was in use.

In one embodiment of the invention a partial flow is separated from the combustion air flow, conveyed past the engine and combined with the exhaust gas flow only in situations, in which the characteristic curve of the compressor is close to the surge limit, i.e. typically when the engine load is 50-85%. When the load is less than 50% and more than 85%, the by-pass system is out of use, whereby all combustion air is led from the compressor to the engine. Then, the rotational speed of the turbocompressor may be maintained at optimum level in view of operating efficiency, and excess increase of the rotational speed at high loads is avoided.

BRIEF DESCRIPTION OF THE DRAWINGS

In the following, the invention is explained in more detail, by way of example, with reference to the appended drawing. The drawing is a schematic view of one arrangement according to the invention.

DETAILED DESCRIPTION

The arrangement according to the drawing comprises a piston engine 1, which is provided with a turbocompressor 2. The turbocompressor 2 comprises a compressor 3 and a turbine 4, which are interconnected by means of a drive shaft 5. The drive shaft 5 is arranged to the housing of the turbocompressor 2 via a bearing system. The task of the compressor 3 is to supply pressurised combustion air to the engine 1. The compressor 3 comprises a rotatable rotor provided with blades to pressurise the combustion air to be conveyed to the engine 1. A flow space 6 is adapted on the high-pressure side of the compressor 3, i.e. between the compressor 3 and the combustion chambers 10 of the engine cylinders, for conveying pressurised combustion air to the cylinders 10. The flow space 6 is provided with a heat exchanger 7 for cooling or heating the combustion air. Moreover, the flow space 6 comprises a charge air receiver 8, which is located after the heat exchanger 7 in the flow direction of the combustion air. The flow space 6 also comprises inlet channels 9 adapted between each cylinder 10 and the charge air receiver 8 for conveying combustion air from the charge air receiver 8 to the cylinders 10.

An exhaust gas channel 11 is adapted between the cylinders 10 and the high-pressure side of the turbine 4 for conveying the exhaust gases of the engine to the turbine 4. Also the turbine 4 comprises a rotor provided with blades and being rotated by the exhaust gas coming from the engine 1. Moreover, the engine 1 comprises fuel feeding means (not shown) for supplying fuel into the cylinders 10.

The engine 1 is provided with a moistening device, by which the moisture content of combustion air can be raised, while the engine is running. The humidification of combustion air decreases the amount of nitrogen oxides (NOx) generated during the combustion. Combustion air is humidified by injecting water thereto. Water is mixed with the combustion air in the flow space 6 before the combustion air is conveyed to the heat exchanger 7. The combustion air moistening device comprises a feed pipe 12, which is connected to the water treatment system. Injection nozzles 15 opening into the flow space 6 are connected to the feed pipe 12, from which nozzles water is supplied in the form of droplets or mist into the flow space 6 at a point located before the heat exchanger 7 in the flow direction of the combustion air. Moreover, the feed pipe 12 is provided with a shut-off valve 16, by which the water flow to the injection nozzles 15 can be allowed or prevented.

When the combustion air moistening device is in use, the mass flow rate of the exhaust gas passing through the turbine 4 increases to the same extent as water is injected thereto. Consequently, the rotational speed of the turbine 4 increases and the pressure of the combustion air in the flow space 6 rises at constant engine load. The mass flow rate of the air passing through the compressor 3, however, remains constant, whereby the operating point of the compressor 3 moves towards the surge limit. To prevent the surging of the compressor 3 there is a by-pass arrangement provided in connection with the engine 1 for moving the operating point of the compressor 3 during the humidification of combustion air. The arrangement comprises a by-pass channel 13 extending from the flow space 6 to the exhaust gas channel 11, through which by-pass channel a part of the combustion air may be conveyed from the flow space 6 past the cylinders 10 of the engine to the exhaust gas channel 11. The first end of the by-pass channel 13 opens to the flow space 6 and the second end to the exhaust gas channel 11. In order to prevent the water injected into the flow space 16 from flowing into the by-pass channel 13, the first end of the by-pass channel 13 opens to the flow space 6 at a point located before the injection point of the nozzles 15 in the flow direction of the combustion air. The second end of the by-pass channel 13 opens to the exhaust gas channel 11 at a point located before the turbine 4 in the flow direction of the exhaust gas. Arrows in the drawing indicate the flow directions of the combustion air and exhaust gas. The by-pass channel 13 is provided by with a control valve 14 for adjusting the combustion air flow through the by-pass channel 13.

While the engine 1 is running, combustion air is led to the compressor 3, where its pressure is raised by means of a rotor to exceed the ambient pressure. The pressurised air is led to the flow space 6 on the high-pressure side of the compressor 3. If the humidification of combustion air is in use, a partial flow will be separated from the combustion air flow and led to the by-pass channel 13. The combustion air led to the by-pass channel 13 does not participate in the combustion process in the cylinders 10 of the engine. The partial flow led to the by-pass channel 13 is 5-10% of the total air flow passing through the compressor 3. The volume of the partial flow is adjusted by the control valve 14. Combustion air is humidified by injecting water thereto through the nozzles 15. The amount of water to be mixed with combustion air is adjusted so that the combustion air conveyed to the cylinders 10 is saturated or essentially saturated. The amount of water to be fed to the combustion air is adjusted by opening and closing a suitable number of the water injection nozzles 15, according to the present need, while the injection pressure of each nozzle is about constant. Thus it is possible to provide both an advantageous water droplet formation, or mist spraying, and at the same time a correct amount of water is mixed with combustion air.

The humidified combustion air is conveyed to the heat exchanger 7 and heated or cooled by the heat exchanger 7 typically to 70-85° C. The combustion air may be heated or cooled for instance by the low-temperature cooling water of the engine 1 that is led to the heat exchanger 7. After the heating/cooling, the combustion air is conveyed to the charge air receiver 8. From the charge air receiver 8 combustion air is led via inlet channels 9 to the cylinders 10. Fuel, for instance heavy fuel oil, is supplied to the cylinders 10 and combusted by means of the combustion air in the combustion chambers 10 of the cylinders. The exhaust gas generated during the combustion is conveyed through the exhaust gas channel 11 towards the turbine 4. Before entering the turbine 4 the exhaust gas flow is joined by the combustion air led from the flow space 6 via the by-pass channel 13. Subsequently, the exhaust gas flow and the combustion air flow combined therewith are conveyed to the turbine 4. While passing through the turbine 4 the flow rotates the rotor of the turbine 4, the rotary motion of which is transmitted by a shaft the shaft 5 to the rotor of the compressor 3.

A partial flow is separated from the combustion air flow and led via the by-pass channel 13 to the exhaust gas channel 11 whenever the humidification of combustion air is in use. Then, the control valve 14 is kept open. An alternative solution is to separate a partial flow only if the load of the engine 1 is at a specific level regardless of the humidification of combustion air being in use. Generally, when the load level of the engine 1 exceeds 85% or is under 50%, the operating point of the compressor 3 is sufficiently far from the surge limit, whereby the by-pass system may be shut off by closing the valve 14. When the load of the engine 1 is 50-85%, the valve 14 is kept open, whereby the by-pass system 13 is in use. The by-pass system 13 may be shut off, when the load level exceeds 85% in order to prevent excessive rise of the rotational speed of the turbocompressor 2.

If the combustion air humidification system is not in use, the shut-off valve 16 of the feed pipe 12 is closed, whereby water is not allowed to enter the injection nozzles 15. Further, the valve 14 of the by-pass channel 13 is closed, whereby combustion air is not allowed to flow via the by-pass channel 13 to the exhaust gas channel 11. Then, the entire combustion air flow from the compressor 3 is conveyed via the heat exchanger 7 to the cylinders 10. The combustion air is cooled by the heat exchanger 7 typically to 50-55° C.

The invention claimed is:

1. A method of operating a turbocompressor-piston engine to prevent surge condition having a compressor on an inlet channel and a turbine on an exhaust channel, a bypass channel, a heat exchanger being downstream of the compressor and upstream of a charge air receiver, injection nozzles injecting water droplets or mist at a location upstream of the heat exchanger and downstream of the bypass channel branching off the inlet channel at a compressor outlet, the method comprising steps of:
    a. pressurizing air with the compressor of the turbocompressor,
    b. separating the pressurized air from the compressor into a main flow and a partial flow, a volume of the partial flow being 5-10% of the total air flow passing through the compressor,
       wherein the partial flow branches off from the pressurized air flow only in the event that the load of the engine is 50-85% of a maximum load of the engine,
    c. humidifying the main flow of pressurized air by injecting the water droplets or mist,
    d. heating the main flow of pressurized and humidified air,
    e. conveying the main flow of pressurized, humidified and heated air to the engine,
    f. combusting fuel in a cylinder of the engine with the pressurized, humidified and heated air,
    g. conveying a flow of exhaust gases generated during the combustion directly to an inlet of the turbine of the turbocompressor, and
    h. conveying the partial flow bypassing the engine and combining the partial flow with the flow of exhaust gases to the turbine.

2. A method of operating a turbocompressor-piston engine to prevent surge condition having a compressor on an inlet channel and a turbine on an exhaust channel, a bypass channel having a control valve, a heat exchanger being downstream of the compressor and upstream of a charge air receiver, injection nozzles injecting water droplets or mist at a location upstream of the heat exchanger and downstream of the bypass channel branching off the inlet channel at a compressor outlet, the method comprising steps of:
    a. pressurizing air with the compressor of the turbocompressor,
    b. separating the pressurized air from the compressor into a main flow and a partial flow, a volume of the partial flow being 5-10% of the total air flow passing through the compressor,
       wherein the partial flow branches off from the pressurized air flow only in the event that the load of the engine is 50-85% of a maximum load of the engine;
    c. humidifying the main flow of pressurized air by injecting the water droplets or mist,
    d. heating the main flow of pressurized and humidified air,
    e. conveying the main flow of pressurized, humidified and heated air to the engine,
    f. combusting fuel in a cylinder of the engine with the pressurized, humidified and heated air, and
    g. conveying a flow of exhaust gases generated during the combustion directly to an inlet of the turbine of the turbocompressor, and
    h. adjusting the control valve to maintain a pressure of the partial flow of pressurized air at a pressure lower than that at the inlet of the engine.

3. A method according to claim 2, wherein the step of conveying the partial flow of pressurized air bypassing the engine combines with the flow of exhaust gases to the turbine.

* * * * *